US012318895B2

(12) United States Patent
Waite

(10) Patent No.: US 12,318,895 B2
(45) Date of Patent: Jun. 3, 2025

(54) FILTER EXTRACTION TOOL

(71) Applicant: Douglas Waite, Coolidge, AZ (US)

(72) Inventor: Douglas Waite, Coolidge, AZ (US)

( * ) Notice: Subject to any disclaimer, the term of this patent is extended or adjusted under 35 U.S.C. 154(b) by 246 days.

(21) Appl. No.: 18/074,458

(22) Filed: Dec. 3, 2022

(65) Prior Publication Data

US 2024/0181612 A1 Jun. 6, 2024

(51) Int. Cl.
*B25B 27/02* (2006.01)

(52) U.S. Cl.
CPC .................................. *B25B 27/023* (2013.01)

(58) Field of Classification Search
CPC . B25B 27/0028; B25B 27/023; B25B 27/062; B25B 27/24; Y10T 29/53848; Y10T 29/53857; Y10T 29/53878; Y10T 29/53883; Y10T 29/53909; Y10T 29/53987; Y10T 29/53552; F16K 1/00; F16K 51/00; F16K 11/0782
USPC ................................................ 29/221.6, 256
See application file for complete search history.

(56) References Cited

U.S. PATENT DOCUMENTS 1,807,329 A * 5/1931 Bertrand ............... B25B 27/026 60/533
4,210,990 A * 7/1980 Krieger ................. B25B 27/023 29/263
5,201,104 A * 4/1993 Winkeljann ............ B25B 31/00 29/256
2016/0207183 A1* 7/2016 Owens .................. B25B 27/062

* cited by examiner

*Primary Examiner* — Brian D Keller
*Assistant Examiner* — Jason Khalil Hawkins
(74) *Attorney, Agent, or Firm* — Bruce A. Lev

(57) ABSTRACT

A filter extraction tool adapted to be removably attached to a plumbing fixture and simultaneously to a water filter within the plumbing fixture to thereby remove the water filter from the plumbing fixture. The filter extraction tool includes a fixture connecting sleeve, a linear screw, and a filter connecting cup rotatably attached to the linear screw.

6 Claims, 7 Drawing Sheets

FILTER EXTRACTION TOOL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

1. Field of the Invention

This invention relates generally to water filters, and more specifically to water filters within plumbing fixtures.

2. Description of the Related Art

Prior art water filter tools have been designed to grab or attach to water filters and either rotate or pull them to remove them from their in-situ position within their respective fixtures. However, damage to the fixture occurs when a person pushes, pulls, and twists the filter and thereby on the fixture when attempting to remove the filter. Stripping of threads and loosening of connections between parts and pipes, especially over time and repeated filter changes, is a common occurrence and problem. Thus a need exists to provide a filter extraction tool that avoids the aforementioned problems.

BRIEF SUMMARY OF THE INVENTION

In view of the foregoing disadvantages inherent in the known types of filter extraction tools or the like in the prior art, the present invention provides a filter extraction tool adapted to be removably attached to a plumbing fixture and simultaneously to a water filter within the plumbing fixture to thereby remove the water filter from the plumbing fixture. As such, the general purpose of the present invention, which will be described subsequently in greater detail, is to provide a filter extraction tool including a fixture connecting sleeve, a linear screw, and a filter connecting cup rotatably attached to the linear screw, with all the advantages of the prior art and none of the disadvantages.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

Figure 1:
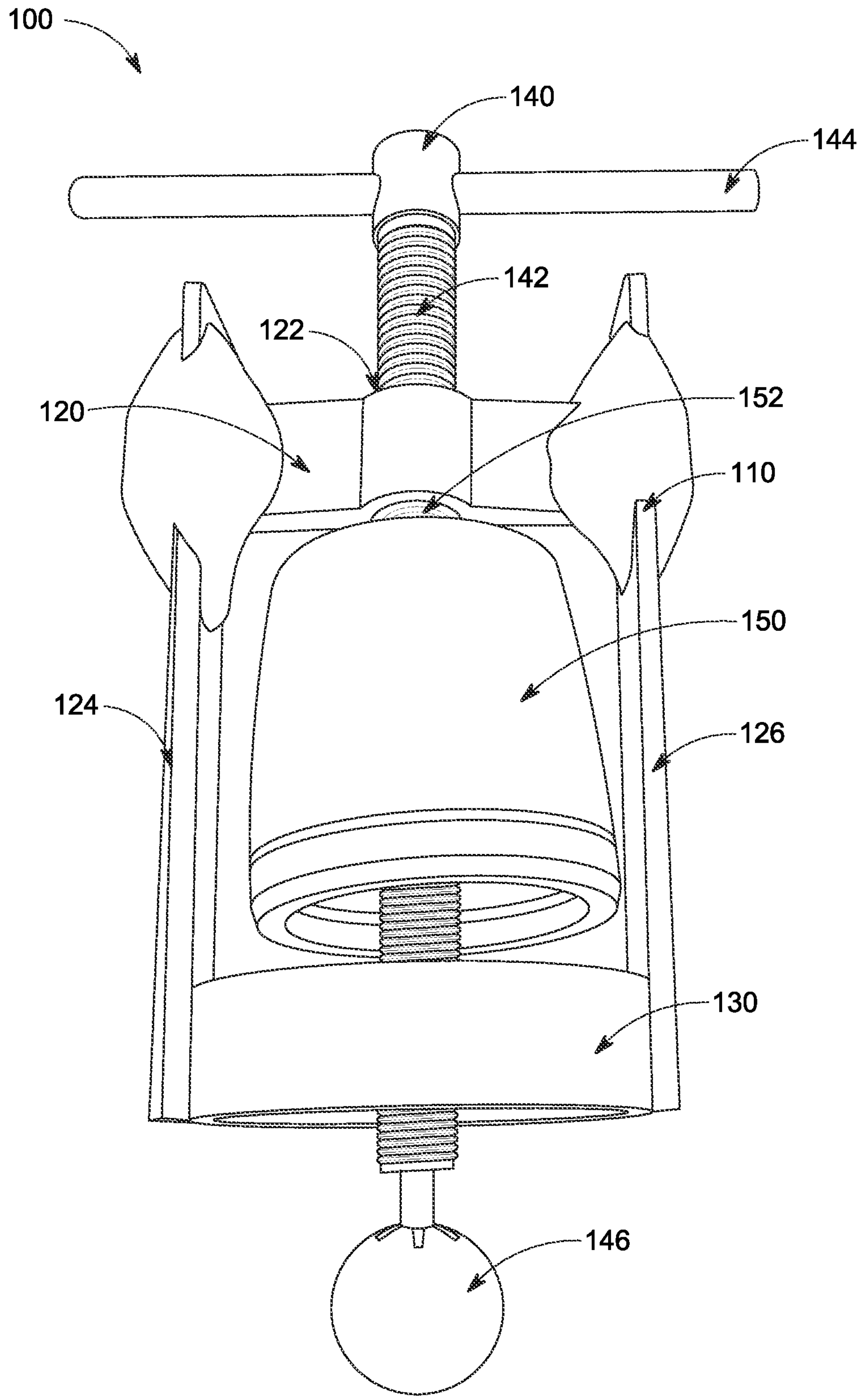
FIG. 1 shows a front view of the filter extraction tool according to the preferred embodiment of the present invention.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

The instant filter extraction tool 100 was originally designed to be used to remove the rear half 300 of Delta shower filter cartridges (models RP19804 and RP46074). After removing the trim, bonnet nut, and top half of the filter cartridge, the fixture connecting sleeve 130 of the filter extraction tool is screwed onto the valve body 310 in place of the bonnet nut. Then the rotatable handle 140 of the filter extraction tool is used to lower the filter connecting cup 150 to meet the rear half of the filter cartridge. The cup will lock onto the rear half of the filter cartridge with a ¼ turn to the right. Then the rotatable handle can be used to remove the filter connecting cup, pulling the rear half of the filter cartridge with it. Finally, the rear half of the filter cartridge is removed from the filter extraction tool.

Figure 2:
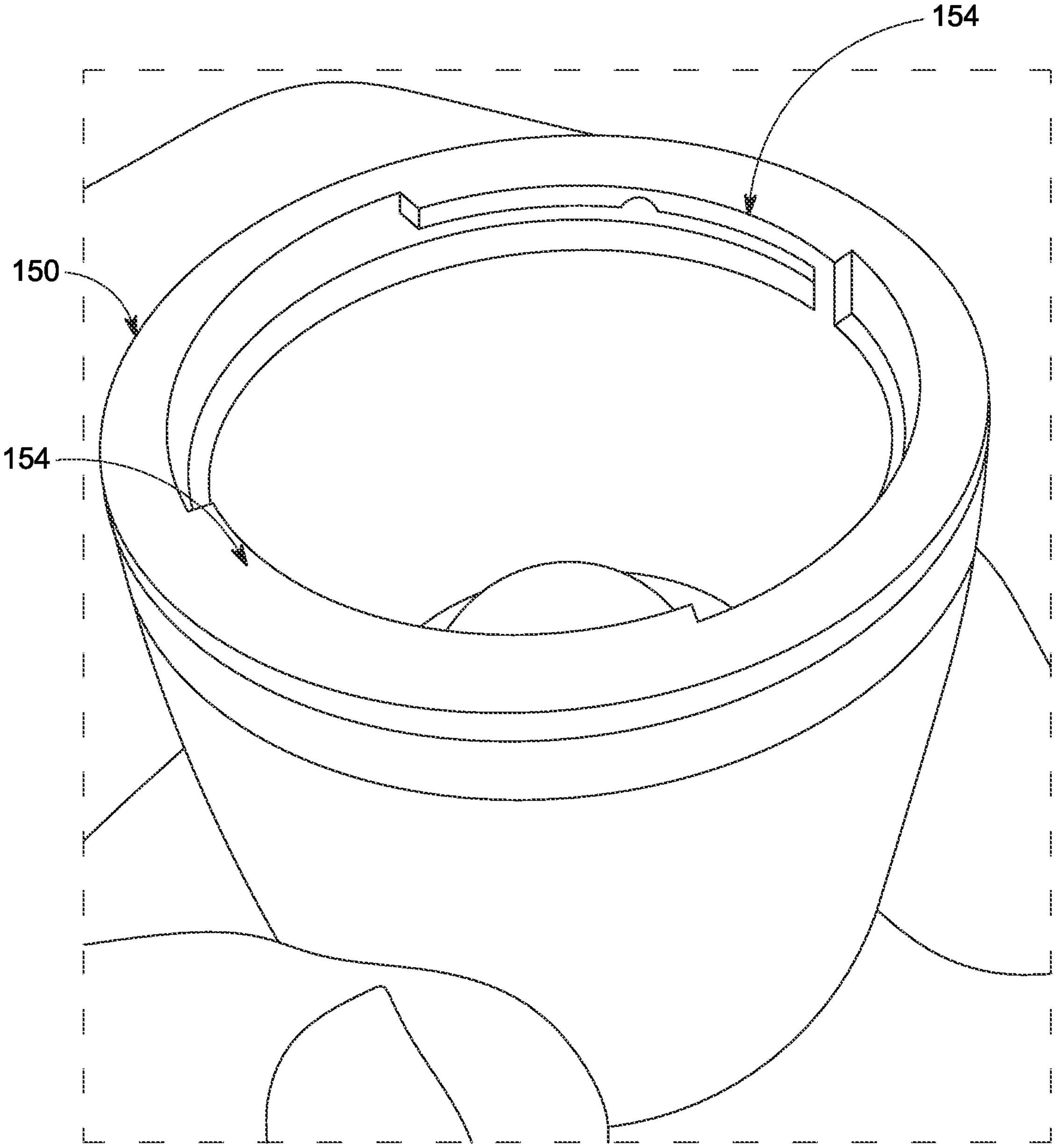
FIG. 2 shows a perspective view of the filter connecting cup of the filter extraction tool according to the preferred embodiment of the present invention of FIG. 1.
Figure 3:
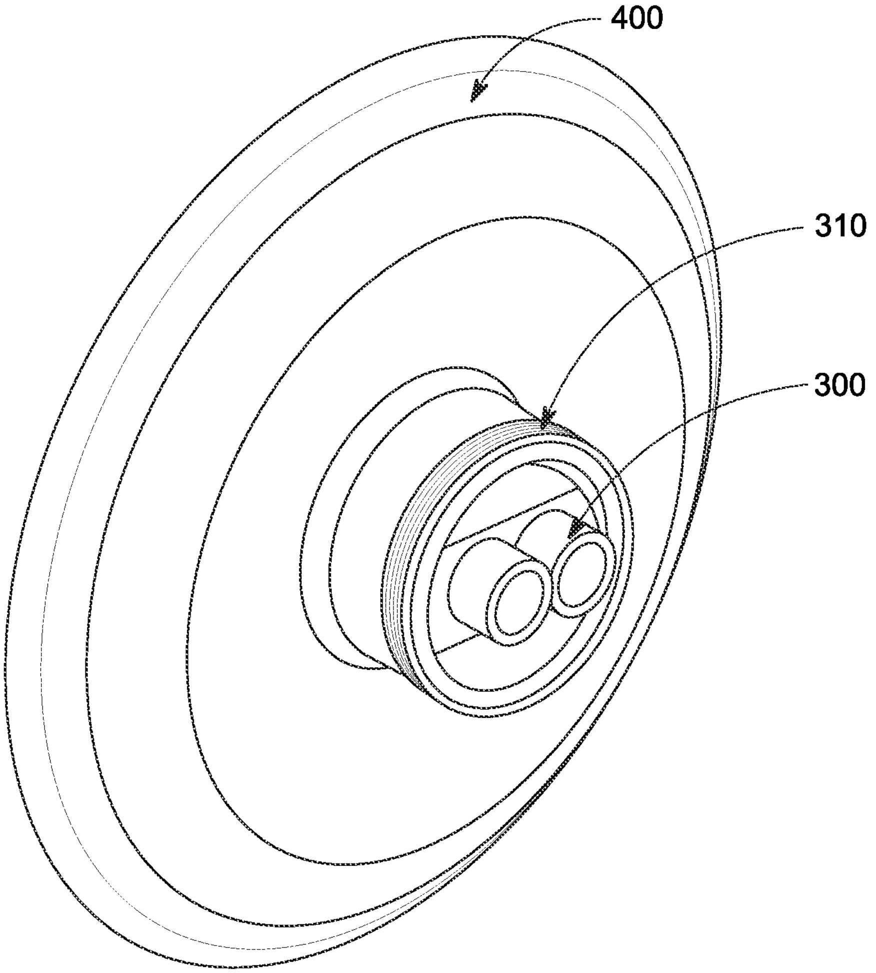
FIG. 3 shows a perspective view of a water filter within a plumbing fixture.
Figure 4:
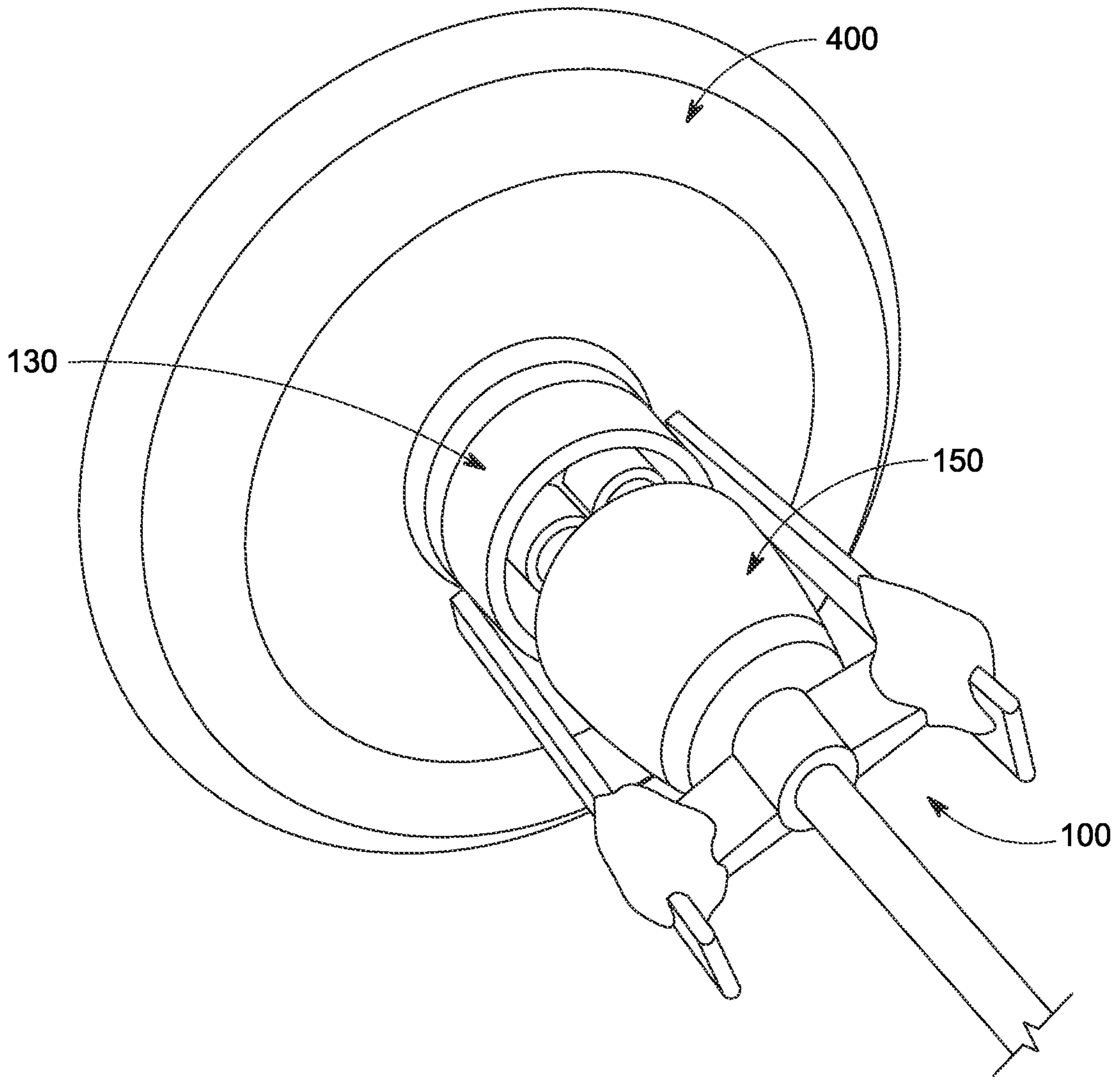
FIG. 4 shows a perspective view of the filter extraction tool being attached to the plumbing fixture.
Figure 5:
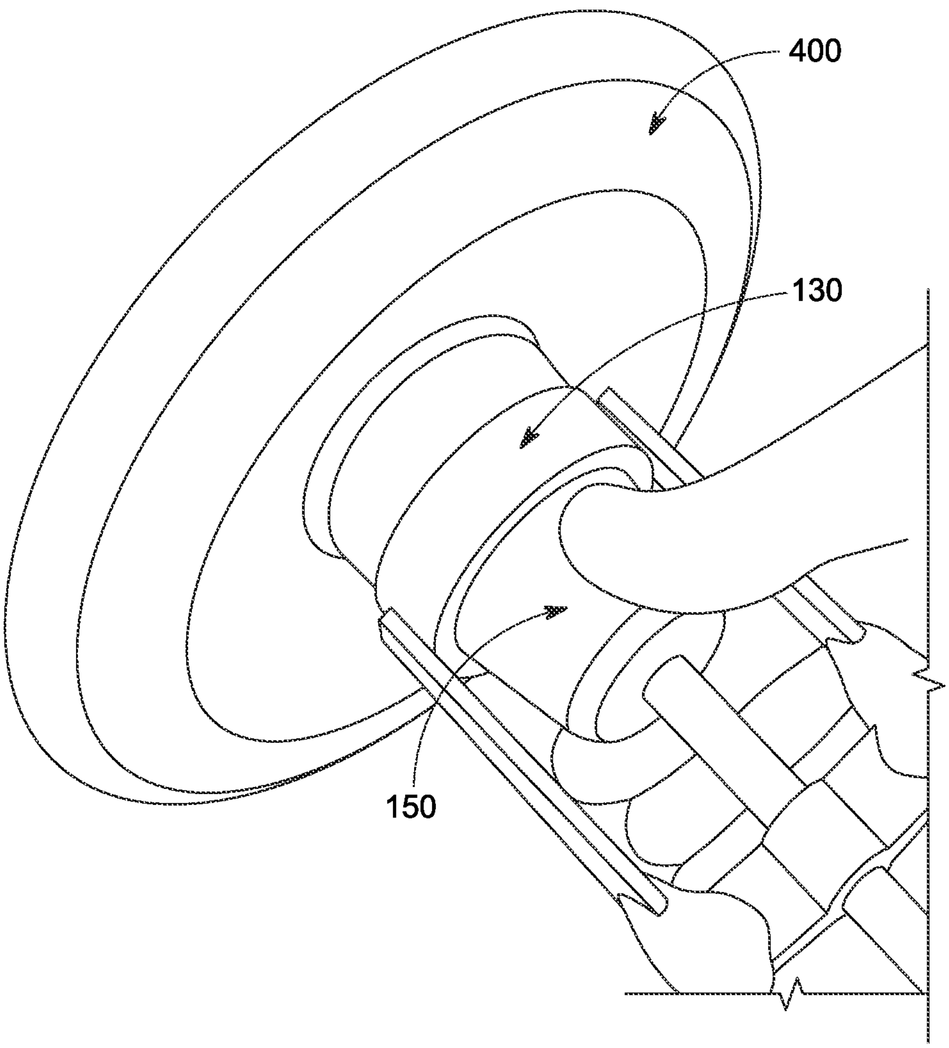
FIG. 5 shows a perspective view of the filter connecting cup being attached to the water filter.
Figure 6:
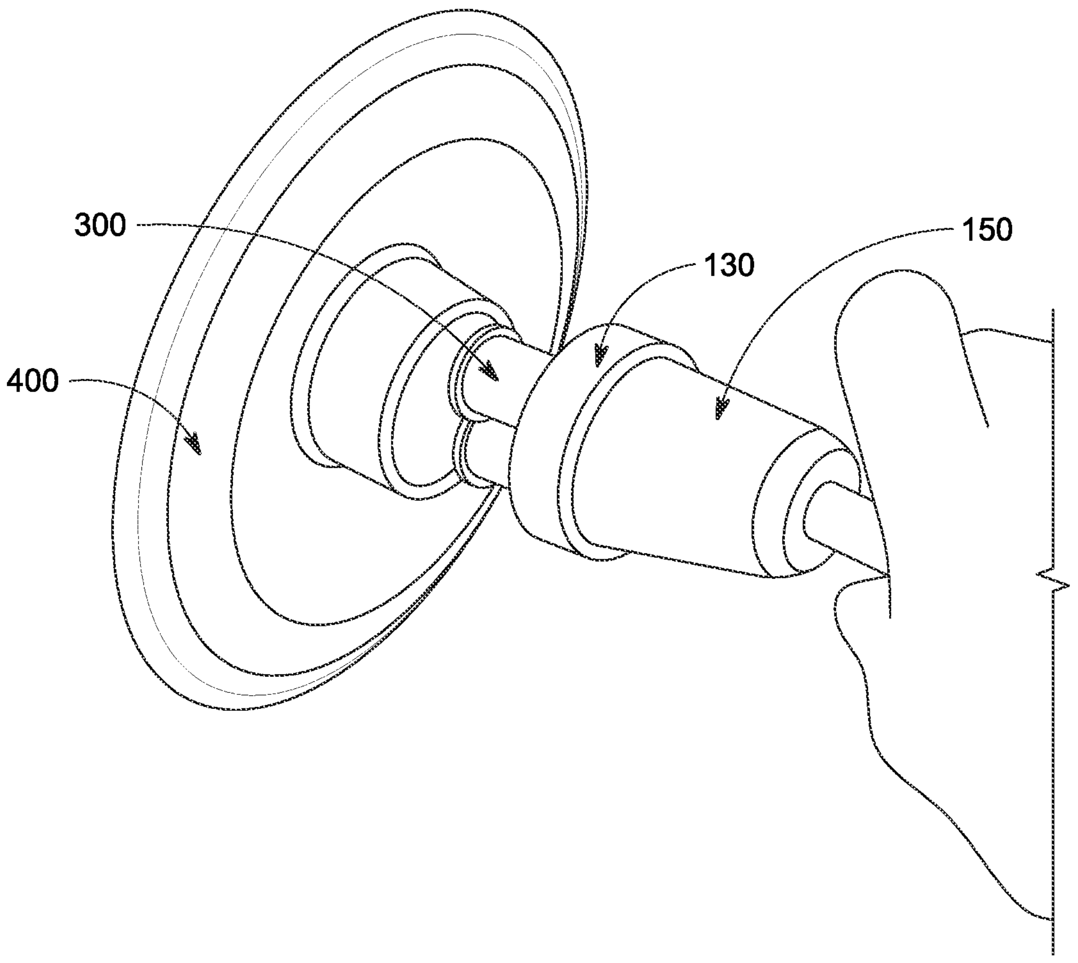
FIG. 6 shows a perspective view of the filter extraction tool pulling out the water filter from the plumbing fixture.
Figure 7:
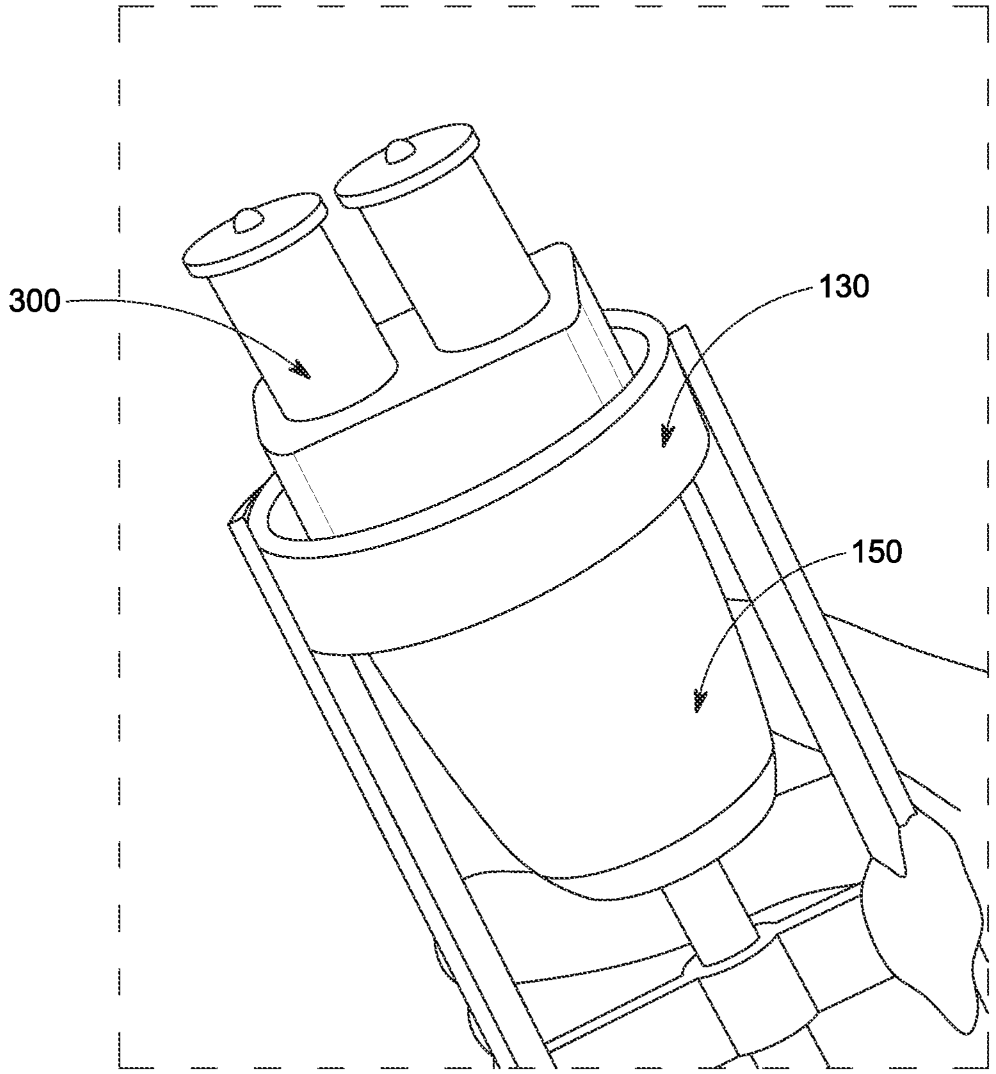
FIG. 7 shows a perspective view of the water filter attached to the filter extraction tool after being pulling out from the plumbing fixture.

Turning now descriptively to drawing, referring to FIGS. 1-7, the present invention discloses a filter extraction tool 100 comprising a main body 110 including a cross bar 120 including a threaded aperture 122 therethrough, a first arm 124 connected at a proximal end thereof to a first end of the cross bar, a second arm 126 connected at a proximal end thereof to a second end of the cross bar, and a fixture connecting sleeve 130 including threads upon an inner surface thereof adapted to interdigitate with threads on an outer surface of a plumbing fixture, wherein the fixture connecting sleeve is connected to and between respective distal ends of the first and second arms; a rotatable handle 140 including an elongated threaded shaft 142 extending through and rotatably engages with the threaded aperture of the cross bar of the main body, and wherein the elongated threaded shaft has a length greater than the lengths of the first and second arms, a hand grip 144 connected to a proximal end of the elongated threaded shaft and adapted to allow a user to rotate the elongated threaded shaft, and a retention member 146 connected to a distal end of the elongated threaded shaft; and a filter connecting cup 150 including an aperture 152 therethrough adapted to allow the elongated threaded shaft of the rotatable handle to slide therethrough, and at least one engagement lip 154 formed upon an inner surface thereof and adapted to engage with respective engagement lips of a water filter 300 within a plumbing fixture 400, wherein the filter connecting cup is located in between the hand grip and the retention member and in between the cross bar of the main body and the retention member.

When in use, the fixture connecting sleeve 130 is adapted to be connected to the plumbing fixture, then the filter connecting cup 150 is releasably connected with the water filter 300, then the rotatable handle 140 is rotated counter clockwise such that the retention member 146 contacts the filter connecting cup and pulls the filter connecting cup and the water filter from the plumbing fixture 400, and then the connecting sleeve 130 is removed from the plumbing fixture along with the water filter.

The retention member 146 may be formed having a spherical shape, the fixture connecting sleeve 130 may be formed having a cylindrical shape, and the filter connecting cup 150 may be formed having a bell shape. Furthermore, the main body and the rotatable handle 140 may be formed from stainless steel or copper, the filter connecting cup 150 may be formed from ceramic, stainless steel, copper, or plastic.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. A filter extraction tool comprising:
a main body including;
  a cross bar including:
    a threaded aperture therethrough;
  a first arm;
    wherein said first arm is connected at a proximal end thereof to a first end of said cross bar;
  a second arm;
    wherein said second arm is connected at a proximal end thereof to a second end of said cross bar; and
  a fixture connecting sleeve including;
    threads upon an inner surface thereof adapted to interdigitate with threads on an outer surface of a plumbing fixture;
    wherein said fixture connecting sleeve is connected to and between respective distal ends of said first and second arms;
a rotatable handle including:
  an elongated threaded shaft;
    wherein said elongated threaded shaft extends through and rotatably engages with said threaded aperture of said cross bar of said main body; and
    wherein said elongated threaded shaft has a length greater than the lengths of said first and second arms;
  a hand grip;
    wherein said hand grip is connected to a proximal end of said elongated threaded shaft and adapted to allow a user to rotate said elongated threaded shaft; and
  a retention member;
    wherein said retention member is connected to a distal end of said elongated threaded shaft; and
a filter connecting cup including;
  an aperture therethrough adapted to allow said elongated threaded shaft of said rotatable handle to slide therethrough; and
  at least one engagement lip formed upon an inner surface thereof and adapted to engage with respective engagement lips of a water filter within a plumbing fixture;
    wherein each of said at least one engagement lip extends around a circumferential portion of said inner surface of said filter connecting cup, and extends around and forms respective grooves within said circumferential portions, such that when engaging said engagement lips of said water filter only a partial rotation of said filter connecting cup is necessary to securely connect and lock said filter connecting cup with said water filter;
  wherein said filter connecting cup is located in between said hand grip and said retention member, and in between said cross bar of said main body and said retention member;
wherein when in use said fixture connecting sleeve is adapted to be connected to said plumbing fixture, then said filter connecting cup releasably connected with said water filter, then said rotatable handle rotated counter clockwise such that said retention member contacts said filter connecting cup and pulls said filter connecting cup and said water filter from said plumbing fixture, then said connecting sleeve is removed from said plumbing fixture along with said water filter.

2. The filter extraction tool of claim 1, wherein said retention member is formed having a spherical shape.

3. The filter extraction tool of claim 1, wherein said fixture connecting sleeve is formed having a cylindrical shape.

4. The filter extraction tool of claim 1, wherein said filter connecting cup is formed having a bell shape.

5. The filter extraction tool of claim 1, wherein said main body and said rotatable handle are formed from a material chosen from a group of materials consisting of stainless steel and copper.

6. The filter extraction tool of claim 1, wherein said filter connecting cup is formed from a material chosen from a group of materials consisting of ceramic, stainless steel, copper, and plastic.

* * * * *